United States Patent [19]

Brazelton

[11] Patent Number: 4,642,222
[45] Date of Patent: Feb. 10, 1987

[54] POLYMER FEED SYSTEM
[75] Inventor: Carl L. Brazelton, Austin, Tex.
[73] Assignee: Stranco, Inc., Bradley, Ill.
[21] Appl. No.: 627,046
[22] Filed: Jul. 2, 1984
[51] Int. Cl.[4] ............................................. G05D 11/13
[52] U.S. Cl. ..................................... 422/111; 422/135; 366/152; 366/160; 137/3; 137/88; 137/101.21
[58] Field of Search ............... 422/105, 110, 111, 135; 137/3, 88, 98, 101.21; 366/152, 160, 161; 523/319, 336

[56] References Cited

U.S. PATENT DOCUMENTS

| | | | |
|---|---|---|---|
| 2,863,471 | 12/1958 | Thurman | 137/98 |
| 3,038,486 | 6/1962 | Thurman | 137/101.21 |
| 3,039,479 | 6/1962 | Etheridge | 137/3 |
| 3,250,218 | 5/1966 | Sinclair | 137/88 |
| 3,721,253 | 3/1973 | Remke | 137/3 |
| 3,852,234 | 12/1974 | Venema | 523/319 |
| 4,051,065 | 9/1977 | Venema | 252/359 A |
| 4,057,223 | 11/1977 | Rosenberger | 366/172 |
| 4,218,147 | 8/1980 | Rosenberger | 366/162 |
| 4,433,701 | 2/1984 | Cox et al. | 366/152 |

FOREIGN PATENT DOCUMENTS 202025  11/1983  Japan ................................. 366/161

Primary Examiner—David L. Lacey
Attorney, Agent, or Firm—Emrich & Dithmar

[57] ABSTRACT

A polymer feed system comprises at least one mixing and activating apparatus having a water inlet, a polymer inlet and an outlet and constructed and arranged to dilute and fully activate a polymer. The polymer feed system further comprises a conduit for carrying water to the water inlet of the mixing and activating apparatus. A conduit is coupled between the outlet of the mixing and activating apparatus and the first conduit. Activated polymer merges with the remainder of the water and is mixed in a static mixer.

13 Claims, 3 Drawing Figures

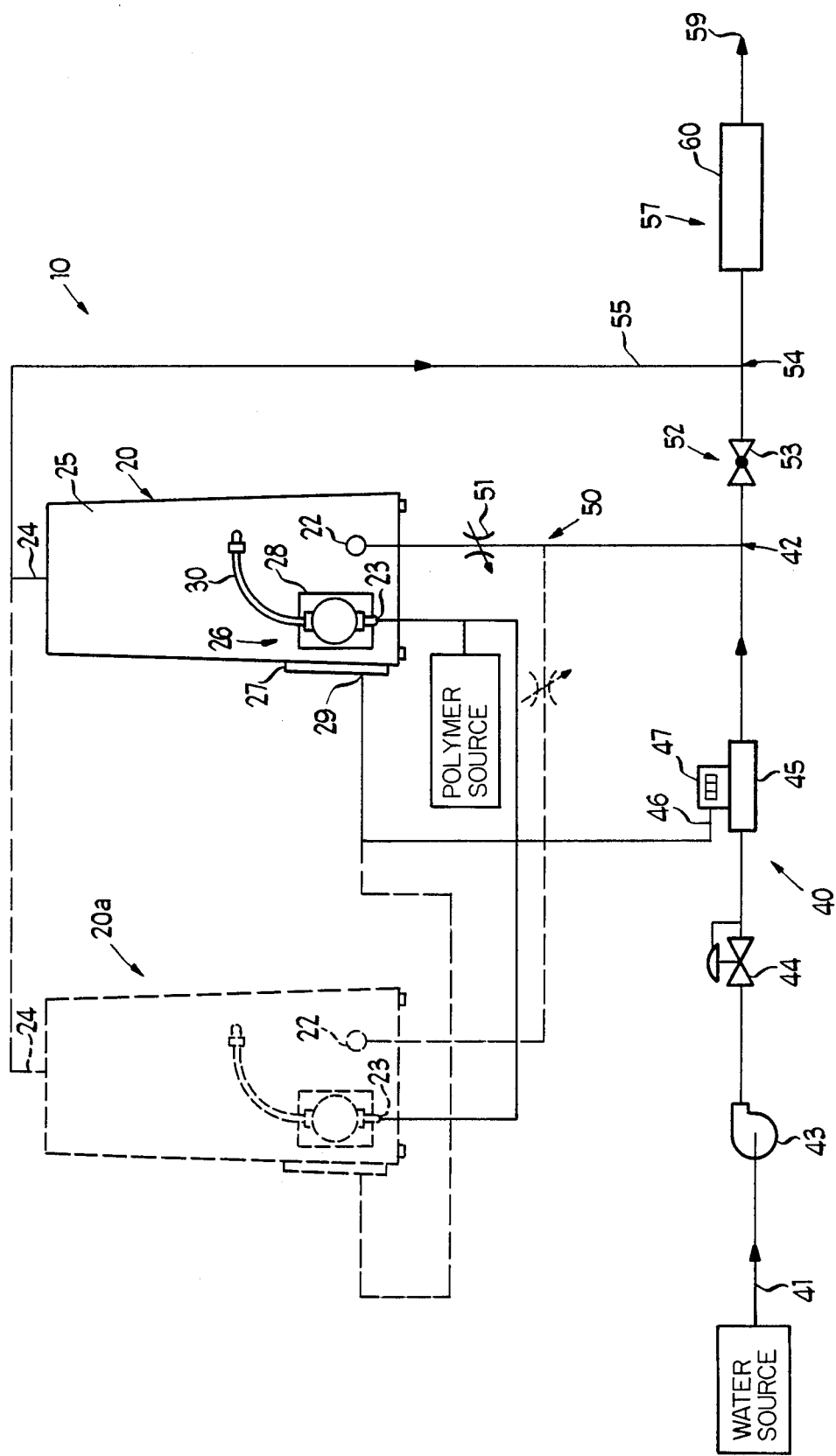

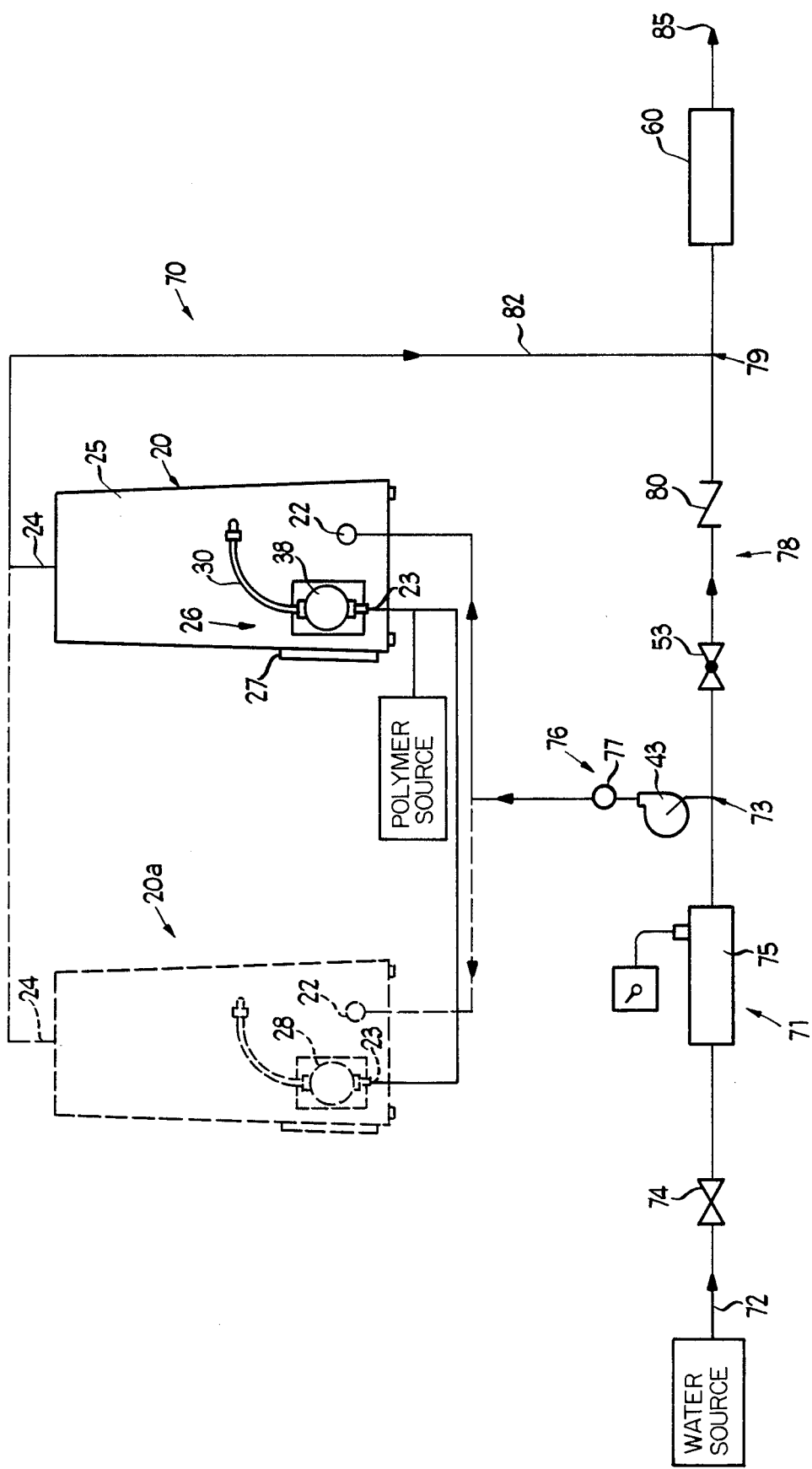

POLYMER FEED SYSTEM

BACKGROUND OF THE INVENTION

This invention relates to a system which mixes water with a fully activated polymer, for use in large scale water treatment and the like.

Polymers (actually water soluble polyelectrolytes) are commonly used in the treatment of water to remove suspended solids. In their inactive state, emulsion polymers are coiled. However, they become activated when suspended in water, so that they uncoil to expose positively and negatively charged sites. U.S. Pat. No. 4,522,502, entitled "Mixing and Feeding Apparatus" (the '502 patent), assigned to the same assignee as this application, discloses an apparatus for activating the polymers. These uncoiled polymers are extremely long, having millions of sites which attract charged particles suspended in the water to be treated.

The apparatus described in the '502 patent is capable of producing fully activated polymer of up to 2% concentration, at a rate of between 0.067 and 8 gallons per minute (GPM). Much higher flow rates may be necessary in certain installations. The same principles described in the '502 patent could be employed to make an apparatus which would deliver the activated and diluted polymer at a greater rate, but such an apparatus would be expensive and unwieldy. In these installations requiring high delivery rates, concentrations much lower than 2% can be effectively employed. As a matter of fact, a solution of high concentration, such as 2% is much too viscous to be usable in many water treatment facilities even though the polymer molecules are fully activated. This is because such a solution will ordinarily have a viscosity so great that it will not readily disperse in the stream being treated.

SUMMARY OF THE INVENTION

It is therefore an important object of the present invention to provide a system which can produce fully activated polymer at a delivery rate much higher than practical with the apparatus described in the '502 patent.

Another object is to dilute an already activated polymer solution to a level where its viscosity is low enough that it will mix quickly and completely without requiring the expenditure of excessive mixing energy.

Another object is to provide a polymer feed system in which the concentration of the polymer in the water is maintained constant irrespective of the rate of water flow.

In summary, there is provided a polymer feed system for activating and diluting a polymer with water comprising at least one mixing and activating apparatus including a water inlet and a polymer inlet and an outlet, the mixing and activating apparatus being constructed and arranged to activate the polymer fully and to dilute the same and to provide the diluted and fully activated polymer at the outlet, the polymer inlet being coupled to a source of polymer for delivering polymer to the mixing and activating apparatus, first means coupled between a source of water and the water inlet for delivering water to the mixing and activating apparatus, and second means coupled between the source of water and the outlet for further diluting the diluted and fully activated polymer.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its construction and operation, and many of its advantages should be readily understood and appreciated.

FIG. 1 is a schematic view of a polymer feed system incorporating the features of one embodiment of the present invention;

FIG. 2 is a schematic view of a polymer feed system incorporating the features of a second embodiment of the present invention.

DETAILED DESCRIPTION OF THE PREFERRED EMBODIMENTS

Figure 1A:
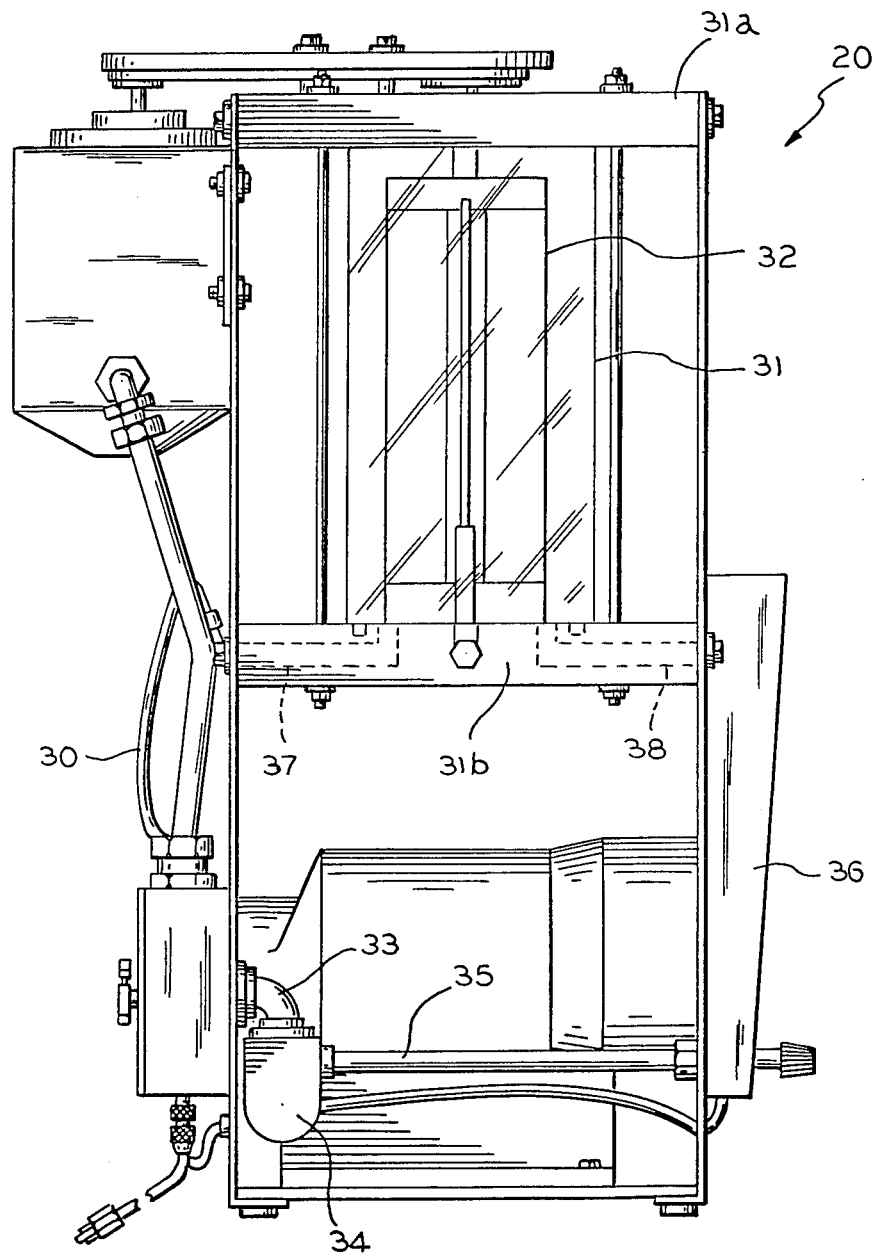
FIG. 1A is a partially schematic view of a portion of the mixing and feeding apparatus depicted in FIG. 1.

Turning now to the drawings, and more particularly to FIG. 1 thereof, there is depicted a polymer feed system incorporating the features of the present invention and generally designated by the numeral 10. The system 10 is for use with a drum of liquid polymer and a source or water. The system 10 receives the polymer and the water and provides a diluted and fully activated polymer at its outlet.

The polymer feed system 10 comprises a mixing and activating apparatus 20 having a water inlet 22, a polymer inlet 23, and an outlet 24. Water is delivered through the water inlet 22 and the polymer is drawn in through the polymer inlet 23. The polymer feed system 10 comprises a frame 25 to which all the parts are mounted. The system 10 further comprises a polymer delivery mechanism 26, the basic element of which is a non-gear type pump 27. Actually, all that is depicted in the drawing is a protruding portion of the pump 27, the remainder thereof being concealed by the frame 25. The pump 27 includes a totally enclosed pump drive with no exposed moving parts and is capable of moving highly viscous materials such as concentrated, liquid polymer. The output of the pump 27 is pulsating in order to provide a means for accurately adjusting the delivery rate. The pump 27 has an end or head 28 that is particularly adapted to pumping viscous polymer. Preferably, the pump 27 is one made by Liquid Metronics, Incorporated of Acton, Mass. in its B7 or D7 series. Any such pump has a pumping rate which can be controlled manually or automatically, depending upon the position of a selector switch. When the switch is in the manual position, the pump rate is adjustable by selecting the stroke length and stroke frequency. When the switch is in the automatic position, its control input 29 receives electrical signals, as will be described, to control the pumping rate.

The inlet 23 is a fitting for connection by way of tubing to a drum or tank (not shown) containing the undiluted or "neat" emulsion-type polymer. The outlet of the pump 27 is coupled by way of tubing 30 to further elements of the mixing and activating apparatus 20.

The mixing and activating apparatus 20 includes an activation vessel 31 defining a mixing chamber and an impeller mechanism 32. The impeller mechanism 32 mixes the polymer and water introduced into the activation chamber. The diluted and fully activated polymer is provided at the outlet 24. The apparatus 20 further comprises a water delivery mechanism which includes the inlet port 22 for connection to a supply of water. Fitting 33 connects the inlet port 22 to a solenoid valve 34 which is normally closed. As soon as power is supplied to the apparatus 20, the valve 34 is opened and water flows through the tubing 35 into a flowmeter 36. The vessel 31 is defined by an upper wall 31a and a lower wall 31b. The outlet 24 is in the upper wall 31a. Formed in the wall 31b, is a pair of L-shaped bores 37 and 38. The bore 37 constitutes an inlet for the polymer and is connected to the tubing 30. The bore 38 is connected to the flowmeter 36 so as to define an inlet for the water. Concentrated polymer is moved by the pump through the bore 37 and into the vessel 31 in the form of a vertical spout. Similarly, water is moved through the bore 38 into the vessel in the form of a vertical spout. Further details of the construction and operation of the apparatus 20 may be had by referring to the '502 patent, the entirety of which is incorporated herein by reference.

The polymer feed system 10 may comprise one or more additional mixing and activating apparatuses 20a, each of which is substantially identical to the mixing and activating apparatus 20. All of the mixing and activating apparatuses are coupled in parallel such that their outlets 24 are connected together as are their water inlets 22. The polymer inlets 23 may be coupled to different drums containing polymer.

The polymer feed system 10 further comprises a first conduit 40 having an inlet 41 for connection to a source of water. The conduit 40 has an outlet coupled to a tee 42. The conduit 40 has therein a booster pump 43, a pressure regulator 44 and a flowmeter 45. The booster pump 43 may or may not be necessary depending upon the water pressure at the inlet 41. The pressure regulator 44 maintains the pressure at a given value irrespective of variations in the inlet pressure.

The flowmeter 45 measures the rate of water therethrough and provides an electrical signal at an output 46 thereof representative of the flow rate. A preferred flowmeter 45 is one made by Liquid Metronics, Incorporated. The relationship of the flow rate to the magnitude of these electrical signals is controlled by settings on a dial 47, as will be explained.

The '502 patent discloses the apparatus 20 as having a flowmeter for the water. However, since the flowmeter 45 is provided in the system 10, an additional flowmeter in the apparatus 20 is not required. Moreover, the pump 27 is electronically controlled, whereas the flow rate of the pump described in the '502 patent is manually controlled.

A second conduit 50 between the tee 42 and the water inlet 22 brings water into the apparatus 20. The conduit 50 includes a constant flow valve 51 which maintains the water flow rate into the apparatus 20 constant irrespective of changes elsewhere in the system 10. A fourth conduit 52 is coupled between the tee 42 and a tee 54. A conduit 55 is coupled between the outlet 24 of the apparatus 20 and the tee 54. A fifth conduit 57 is connected between the tee 54 and the outlet 59 of the system.

The conduit 57 includes a static mixer 60. The static mixer 60 incorporates a series of semielliptical plates positioned in a tubular housing to thoroughly mix the water in the conduit 52 and the fully activated polymer in the conduit 55. A throttling valve 53 is in the conduit 52.

In explaining the operation of the system 10, an example will help. Suppose that the apparatus 20 is constructed to accommodate a maximum water flow rate through it of 8 GPM. In such event, the valve 51 would be selected to provide a constant 8 GPM of water into the apparatus 20. Suppose further that the water flow rate at the inlet 41 will accommodate a maximum rate of 160 gallons per minute (GPM). Thus, the water rate at the inlet 41 would be between 8 and 160 GPM. As previously stated, the booster pump 43 is included to be certain that the water flow rate is capable of delivering the maximum which is determined to be necessary under the system conditions, here 160 GPM.

Suppose that it is desired that the concentration of the effluent at the outlet 59 is to be 0.1%, meaning one part polymer to one thousand parts of water. The dial 47 is set according to manufacturer's specification such that when the flowmeter 45 measures 8 GPM then the electrical signal on the output 46 is such as to cause the polymer pump 27 to supply 0.008 GPM of polymer. The throttling valve 53 would be closed, so that no water would flow through the conduit 52. All of the water would flow through the conduit 50. Because of the constant flow valve 51, the flow rate would be 8 GPM. The flowmeter 45 would measure 8 GPM and would therefore produce an electrical signal to cause the pump 27 to deliver 0.008 GPM of polymer into the apparatus 20, whereby the flow through the conduits 55 and 57 would be 8 GPM of 0.1% concentration.

Suppose that it is desired to provide 160 GPM of 0.1% polymer at the outlet 59. Then, the throttling valve 53 would be fully opened. The water flow in the conduit 50 would remain 8 GPM because of the constant flow valve 51. The flow rate into the conduit 52 would be 152 GPM. The flowmeter 45 would measure 160 GPM flowing therethrough (8+152). That would be reflected as a voltage on the output 46 that would increase the rate of the pump 27 by a factor of 20. Thus, while the flow rate of water into the apparatus 20 remains 8 GPM, the flow rate of polymer into the apparatus 20 would be 0.16 GPM. Then, the output of the apparatus 20 would be 8 GPM at 2% concentration. In the other leg of the tee 54 is 152 GPM of water concentration. When mixed in the static mixer 60, the effluent at the outlet 59 would have a 0.1% concentration at 160 GPM.

The flow rate can be any value in between. For example, at 100 GPM a 0.1% solution, 92 GPM would flow through the conduit 52. The total flow of 100 GPM would be sensed by the flowmeter 45 and the electrical signal produced at the output 46 would be such as to cause the pump 27 to pump polymer into the apparatus 20. Then the concentration of the liquid out of the apparatus 20 would be 1.25% (100/8×0.1). That will combine with the 92 GPM of water to produce 100 GPM of 0.1% polymer.

In the foregoing example, it was assumed that the desired concentration of the effluent is 0.1%. However, other concentrations can be achieved by the settings of the dial 47 in the flowmeter 45.

The outlet 59 is coupled to a utilization system (not shown) which utilizes the effluent for any number of purposes such as clarifying water in a water treatment plant. The needed concentration of polymer would depend upon the character of the water being treated. That can be sensed by, for example, a streaming current detector which would supply an electrical signal indicative of the polymer concentration required. The flowmeter 45 could be a variation and adapted to receive the electrical signal from the sensor, thereby controlling the concentration automatically.

The system 10 is capable of delivering fully activated and diluted polymer at flow rates at least 20 times the flow rates of the apparatus described in the '502 patent. The maximum concentration from such system is substantially less than is available with the apparatus 20 by itself. But in certain installations, a concentration on the order of 0.1% is all that is required.

Turning now to FIG. 2, there is depicted a polymer feed system 70 constituting a second embodiment of the present invention. The polymer feed system 70 includes the mixing and activating apparatus 20, and if desired, one or more additional mixing and activating apparatuses 20a connected in parallel. The same comments made above with respect to the apparatus 20 in the system 10 are applicable to the apparatus 20 in the system 70. However, the pump 27 need not have a control input. Instead, it need only have a manual dial to set the pumping rate.

The system 70 comprises a first conduit 71 coupled between the water inlet 72 and a tee 73. The conduit 71 includes a main on/off valve 74 and a flowmeter 75. However, the flowmeter 36 in apparatus 20 is required if the flowmeter 75 is placed in a water flow conduit other than inlet conduit 71. The flowmeter 75 measures the flow of water in the conduit 71 and provides indication thereof. The same flowmeter 45 used in the embodiment of FIG. 1 could be utilized, but in this embodiment no automatic control is furnished and, therefore, an electrical output is not necessary. The system 70 further comprises a conduit 76 connected from the tee 73 to the water inlet 22 of the apparatus 20. The conduit 76 includes the booster pump 43 and a pressure reducer 77. The system 70 further comprises a conduit 78 connected between the tee 73 and a further tee 79. The conduit 78 includes the throttling valve 53 and a check valve 80. A conduit 82 couples the outlet 24 of the apparatus 20 to the tee 79.

The check valve 80 prevents the activated polymer in the conduit 82 from upstream flow in the conduit 78, that is, the check valve prevents the activated polymer in the conduit 82 from flowing to the left, as viewed in FIG. 2. The static mixer 60 mixes the water in the conduit 78 with the activated polymer in the conduit 82.

This embodiment performs much the same way as the embodiment depicted in FIG. 1. However, instead of automatic control of the pumping rate of the pump 27 in the apparatus 20, the pumping rate must be controlled manually by selecting its stroking rate and stroking frequency.

What has been described therefor are improved polymer feed systems in which a relatively low capacity activating apparatus 20 is used to generate a much higher volume of diluted and activated polymer.

I claim:

1. A polymer feed system for activating and diluting a polymer with water comprising at least one mixing and activating apparatus including a vessel defining a mixing chamber, a water inlet to said chamber and a polymer inlet to said chamber and an outlet to said chamber, said at least one mixing and activating apparatus being constructed and arranged to activate the polymer fully and to dilute same and to provide the diluted and fully activated polymer at said outlet, a first flowmeter coupled to said water inlet for measuring and indicating the rate of flow of water thereto, pump means having means to set the flow rate of the pump means and coupled to a source of polymer for delivering polymer to said polymer inlet, first conduit means coupled to a source of water, second conduit means coupled between said first conduit means and said first flowmeter for delivering water to said mixing and activating apparatus, said first and second conduit means being coupled at a junction, third conduit means coupled to said outlet, fourth conduit means coupled between said third conduit means and the junction of said first and second conduit means, said third and fourth conduit means being coupled at a junction, and fifth conduit means coupled to the junction of said third and fourth conduit means to provide further diluted and fully activated polymer, said fourth conduit means including a throttling valve for further diluting the diluted and fully activated polymer by an amount depending on the setting of said valve, and a second flowmeter positioned and arranged so as to measure and indicate the rate of flow of water in said first conduit means or said second conduit means.

2. The polymer feed system of claim 1, and further comprising a mixer in said fifth conduit means for mixing the fully activated polymer from said mixing and activating apparatus with the water.

3. The polymer feed system of claim 1, and further comprising a static mixer in said fifth conduit means for mixing the fully activated polymer without the use of any moving parts from said mixing and activating apparatus with the water.

4. The polymer feed system of claim 1, and further comprising a check valve in said fourth conduit means to prevent flow of the activated polymer back to said first conduit means.

5. The polymer feed system of claim 1, and further comprising a pressure reducer in said second conduit means for reducing the pressure of the water before it enters said mixing and activating apparatus.

6. The polymer feed system of claim 1, and further comprising an inlet valve in said first conduit means.

7. The polymer feed system of claim 1, wherein said at least one mixing and activating apparatus includes a frame, said vessel being mounted on said frame, said first flowmeter being mounted on said frame.

8. The polymer feed system of claim 1, wherein said second flowmeter is in said first conduit means.

9. A polymer feed system for activating and diluting a polymer with water comprising at least one mixing and activating apparatus including a water inlet and a polymer inlet and an outlet and a pump means, said mixing and activating apparatus being constructed and arranged to activate the polymer fully and to dilute same and to provide the diluted and fully activated polymer at said outlet, said pump means being coupled to said polymer input for delivering thereto polymer from a source thereof, said pump means having a control input for receiving electrical signals for controlling the pumping rate of said pump means, first conduit means coupled between a source of water and said water inlet for delivering water to said mixing and feeding apparatus, a flowmeter in said first conduit means for measuring the flow rate of water therein, said flowmeter having an electrical output for producing a voltage of a value corresponding to the flow rate of the water in said first means, said electrical output of said flowmeter being coupled to said control input of said pump means for controlling the pumping rate thereof in accordance with the flow rate of said water, and second conduit means coupled to said outlet for accommodating flow of the diluted and fully activated polymer, and third conduit means coupled between said first and second conduit means and including throttling valve means for further diluting the diluted and fully activated polymer by an amount depending on the setting of said valve means.

10. The polymer feed system of claim 9, and further comprising a constant flow valve coupled between said flowmeter and said water inlet to cause the flow rate of water into said mixing and activating apparatus to be constant.

11. The polymer feed system of claim 9, wherein said first conduit means further includes a booster pump coupled between the source of water and said flowmeter for increasing the water pressure.

12. The polymer feed system of claim 11, wherein said first conduit means further includes a pressure regulator between said booster pump and said flowmeter.

13. The polymer feed system of claim 9, wherein the second and third conduit means are connected at a junction, and further comprising a mixer coupled to the junction of said second conduit means and said third conduit means for mixing the water and the diluted and fully activated polymer.

* * * * *